May 6, 1952  E. W. SCHWEIKERT  2,595,491
MOUTH WASHER
Filed Oct. 31, 1950
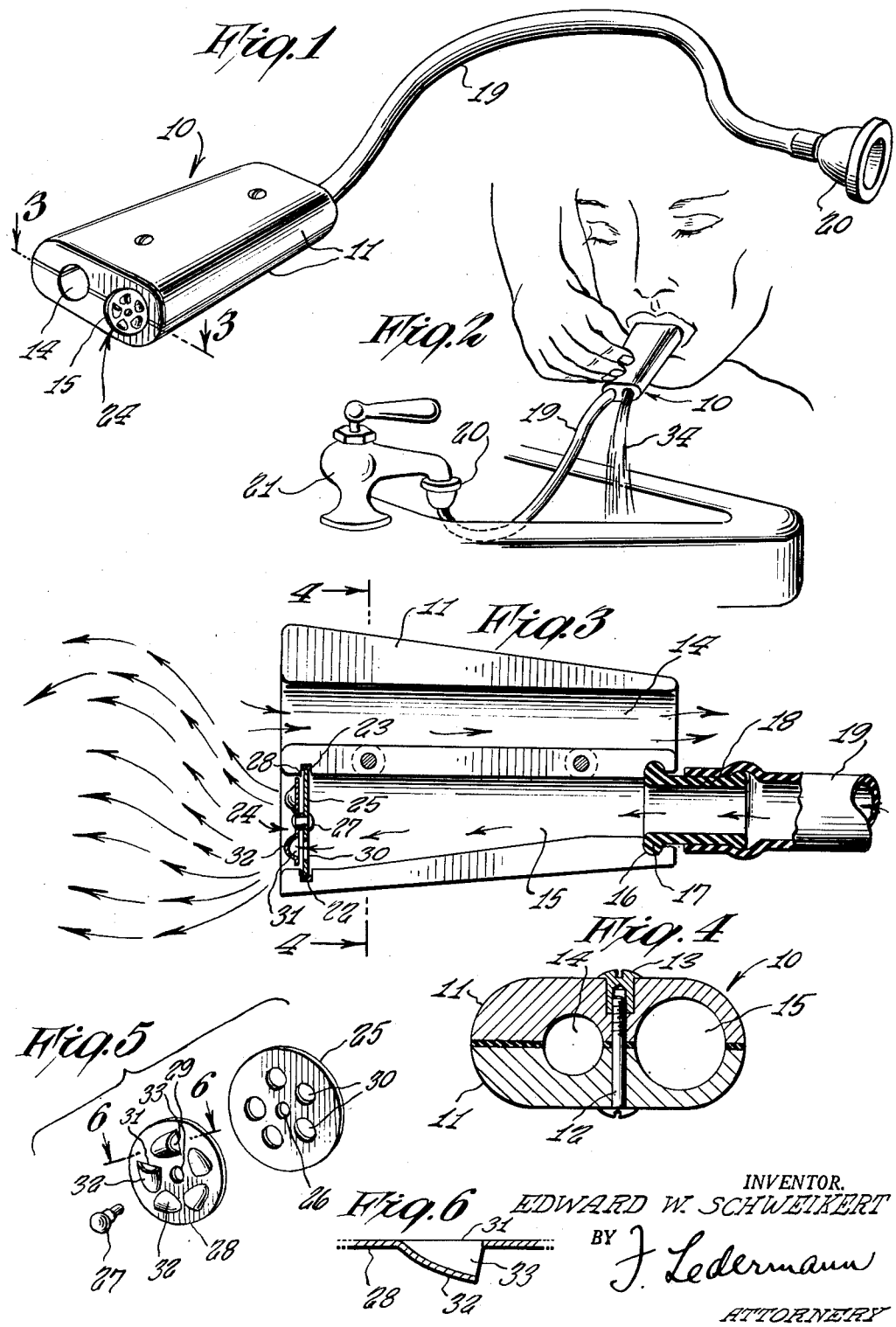
INVENTOR.
EDWARD W. SCHWEIKERT
BY J. Ledermann
ATTORNEYS Patented May 6, 1952

2,595,491

UNITED STATES PATENT OFFICE 2,595,491

MOUTH WASHER

Edward W. Schweikert, New York, N. Y.

Application October 31, 1950, Serial No. 193,127

2 Claims. (Cl. 128—248)

This invention relates to mouth washers or rinsers, and the main object is the provision of a novel, useful and practical device whereby the mouth and teeth may be thoroughly rinsed by a flow of water from, for example, a house tap.

Another object of the invention is the provision of a mouth washer having means actuated by the flowing water for spreading the water entering the mouth in a multiplicity of directions and thereby increasing the effectiveness of the water in washing or rinsing the mouth and the teeth.

The above broad as well as additional and more specific objects will be clarified in the following description wherein characters of reference refer to like-numbered parts in the accompanying drawing. It is to be noted that the drawing is intended solely for the purpose of illustration, and that it is therefore neither desired nor intended to limit the invention necessarily to any or all of the exact details of construction shown except insofar as they may be deemed essential to the invention.

Referring briefly to the drawing, Fig. 1 is a perspective view of the mouth washer of this invention.

Fig. 2 is a perspective view of the mouth washer connected with a water tap, thus illustrating the manner of use of the device.

Fig. 3 is a sectional view taken on the line 3—3 of Fig. 1.

Fig. 4 is a sectional view taken on the line 4—4 of Fig. 3.

Fig. 5 is an exploded perspective view of a detail of the device.

Fig. 6 is a sectional view taken on the line 6—6 of Fig. 5.

Referring in detail to the drawing, the numeral 10 indicates the body of the mouth washer, which is preferably formed of two complementary half-sections 11 held together by one or more screws 12 engaging nuts 13, in an obvious manner. Two spaced longitudinal passages 14 and 15 are provided through the body 10. The passage 15 has, near the rear (right hand, Fig. 3) end thereof a circumferential groove 16 in which the flanged end 17 of a nipple 18, registers; a hose 19 is attached to the nipple 18. On the other end of the hose 19 a conventional connector 20 is provided so that the hose may be readily attached to, or removed from, a household water tap 21.

At the forward end of the passage 15, a second circumferential groove 22 is provided, in which registers, first, a ring gasket 23 of smaller thickness than the depth of the groove 22, and, second, a rotor unit 24.

The rotor unit 24 comprises the stationary disc 25 which registers in the groove 22 against the gasket 23, thus providing a water-tight fit around the edge of the disc. An axial hole 26 through the disc serves for the passage therethrough of a rivet 27. Forward of the disc 25, a disc-shaped rotor 28 is rotatably mounted on the rivet 27, the rotor being provided with an axial hole 29 through which the rivet 27 also passes.

The stationary disc 25 is further provided with a plurality of circumferentially spaced openings 30 therethrough. The rotor 28 likewise has a plurality of circumferentially spaced openings 31 therethrough, and on its forward (left hand, Fig. 3) side, or face, the rotor 28 is additionally provided with a hood 32 over each of the openings 31. The hoods 32 are ellipsoidal in configuration, having at one end an opening 33 into the hood. The hoods are so arranged that the open ends, or openings, 33 thereof all face in the same circumferential direction. It is therefore apparent that, upon passage of water from the passage 15 through the openings 30 of the disc 25 and hence through the openings 31 of the rotor 28, the water upon leaving the openings 30 will be deflected by the hoods 32 to emerge through the hood openings 33. As a result, the rotor 28 will be rotated in a counter-clockwise direction (Fig. 5).

When used as illustrated in Fig. 2, with the tap 21 turned on, water will pass through the hose 19 into and through the passage 15 to emerge from the forward end of the passage 15, into the mouth. The consequent rotation of the rotor 28 in the manner above described, will cause the emerging water to take the form of rotating streams which, in addition to rotating in pinwheel form, will also spread in a direction outward from the rotor; the arrows in Fig. 3 give a general picture of the manner in which the streams of water emerging from the hoods 32 will move, while rotating, within the mouth. It is apparent that such action of the water inside the mouth will assure a thorough washing of the mouth and teeth, and when the device is used after eating, all bits of food will thus be loosened from the teeth.

The water and the food refuse thus contained therein, passes from the mouth through the body passage 14, as shown by the stream 34 in Fig. 2.

Obviously, modifications in form or structure may be made without departing from the spirit or scope of the invention.

I claim:

1. A mouth washer comprising an elongated body having two spaced longitudinal passages therethrough, one of said passages having a hose connected to the rear end thereof, and a rotor mounted at the front end of said one of said passages, said rotor having means for rotating the same upon passage of water therethrough in a forward direction and for breaking up said water into a plurality of rotating streams which strike the interior of the mouth of a person holding the front end of said body in the mouth.

2. The mouth washer set forth in claim 1, said rotor comprising a stationary disc having a plurality of openings therethrough, a rotatable disc rotatably secured to said stationary disc forward of said stationary disc, said rotatable disc having a plurality of openings therethrough, said rotatable disc having a plurality of hoods on the front face thereof equal in number to the number of said openings through said rotatable disc, each of said hoods having one end thereof open, said hoods being arranged on said rotatable disc over said openings through said rotatable disc with said hood openings all facing in the same circumferential direction.

EDWARD W. SCHWEIKERT.

REFERENCES CITED

The following references are of record in the file of this patent:

UNITED STATES PATENTS

| Number | Name | Date |
| --- | --- | --- |
| 452,131 | Haughawout | May 12, 1891 |
| 973,445 | Mantelet | Oct. 18, 1910 |